(12) United States Patent
Kim

(10) Patent No.: US 10,507,715 B1
(45) Date of Patent: Dec. 17, 2019

(54) MOUNT ASSEMBLY FOR VEHICLE

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/153,274

(22) Filed: Oct. 5, 2018

(30) Foreign Application Priority Data

Jun. 4, 2018 (KR) .................. 10-2018-0063993

(51) Int. Cl.
*B60K 5/12* (2006.01)

(52) U.S. Cl.
CPC .................. *B60K 5/1208* (2013.01)

(58) Field of Classification Search
CPC combination set(s) only.
See application file for complete search history.

(56) References Cited

U.S. PATENT DOCUMENTS

| | | | |
|---|---|---|---|
| 4,905,956 A * | 3/1990 | Zemlicka ............ | B60K 5/1291 248/562 |
| 5,242,146 A * | 9/1993 | Tecco .................. | F16F 1/3935 248/636 |
| 7,159,856 B2 * | 1/2007 | Satori .................. | F16F 13/105 267/140.13 |
| 8,430,373 B2 * | 4/2013 | Nishi ................... | F16F 13/108 248/562 |
| 8,864,114 B2 * | 10/2014 | Masuda ............... | F16F 13/106 267/140.13 |
| 8,894,051 B2 * | 11/2014 | Yamamoto ........... | F16F 13/106 267/140.13 |
| 9,428,023 B2 | 8/2016 | Dehlwes | |
| 2015/0252866 A1 * | 9/2015 | Muraoka .............. | F16F 13/103 267/140.13 |
| 2018/0162211 A1 * | 6/2018 | Kim ..................... | B60K 5/1208 |
| 2019/0072151 A1 * | 3/2019 | Kim ..................... | B60K 5/1208 |

FOREIGN PATENT DOCUMENTS

| | | |
|---|---|---|
| DE | 10 2004 039 825 B4 | 10/2010 |
| JP | H 06-346942 A | 12/1994 |
| JP | 2813582 B2 | 10/1998 |
| KR | 10-1092369 | 12/2011 |
| KR | 10-2017-0029677 | 3/2017 |
| WO | 2017/076914 A1 | 5/2017 |
| WO | 2017/129531 A1 | 8/2017 |

* cited by examiner

*Primary Examiner* — Monica E Millner
(74) *Attorney, Agent, or Firm* — Mintz Levin Cohn Ferris Glovsky and Popeo, P.C.; Peter F. Corless

(57) ABSTRACT

A mount assembly for a vehicle is provided. The mount assembly includes a mount that supports an in-vehicle device and a support bracket that is coupled and locked to the mount. The support bracket includes a first hook. In addition, the mount assembly includes a mounting bracket that couples the mount to a vehicle body. The mounting bracket includes a housing to which the mount is coupled and a first stop protrusion to which the first hook of the support bracket is hook-coupled. A wedge ring supports the first hook from behind to prevent the first hook from bending backward and being separated from the first stop protrusion. The wedge ring is formed in a ring shape and includes a protruding portion that protrudes radially outward to support the first hook from behind.

14 Claims, 14 Drawing Sheets

Detailed view of portion A

MOUNT ASSEMBLY FOR VEHICLE

CROSS REFERENCE TO RELATED APPLICATION

The present application claims priority to Korean Patent Application No. 10-2018-0063993, filed on Jun. 4, 2018, the entire contents of which is incorporated herein by reference.

BACKGROUND

Field of the Invention

The present invention relates to a mount assembly for a vehicle, and more particularly, to a mount assembly for a vehicle that prevents release of coupling between parts due to separation of a hook from a stop protrusion in a hook structure.

Description of the Related Art

As the vehicle technologies gradually develop and consumer demands for low vibration and low noise increase, efforts are being made to maximize ride comfort through analysis of noise, vibration, and shock in vehicles. Engine vibration generated in a specific rotations per minutes (RPM) region when the vehicle operates is transmitted to the interior of the vehicle at a specific frequency through the vehicle body, and the frequency component of the detonation in the engine influences the interior of the vehicle.

In the engine of a vehicle, vibration is generated structurally due to the periodic change of the center position caused by the reciprocal movement of the piston and the connecting rod, the inertial force of the reciprocating portion that is exerted in the cylinder axis direction, the inertial force caused by the connecting rod that swings to the left and right sides of the crankshaft, a periodic change in the rotational force applied to the crankshaft, and the like. Accordingly, an engine mount is disposed between the engine and the vehicle body to support the engine and attenuate noise and vibration transmitted from the engine. The engine mount is classified into a rubber engine mount, an air damping mount, and a fluid encapsulated engine mount.

The rubber engine mount, which is usually made of a rubber material, is vulnerable to vibration with low frequency/high amplitude, and attenuation performance thereof is insufficient for the vibration with high frequency/low amplitude and the vibration with low frequency/high amplitude. Accordingly, the fluid encapsulated engine mount is wide used since the fluid encapsulated engine mount is capable of absorbing and attenuating vibrations over a wide range of frequencies including the vibration with high frequency/low amplitude and the vibration with low frequency/high amplitude that is input to the engine mount according to the operation of the engine. In the fluid encapsulated engine mount, also referred to as a fluid mount or a hydro mount, a damping force is generated as the fluid enclosed under the insulator flows through a flow path between an upper liquid chamber and a lower liquid chamber. The fluid encapsulated engine mount is capable of attenuating both high-frequency vibration (low amplitude vibration) and low-frequency vibration (large amplitude vibration).

Recently, active mounts and semi-active mounts have been developed to improve the vibration isolation characteristics of the fluid encapsulated engine mount. Furthermore, weight reduction of a vehicle is related to fuel efficiency and to collision performance and assemblability. The engine mounting system has also been developed with a change in material from steel to aluminum and to plastic for lighter weight, and plastic parts such as plastic cores, plastic brackets, plastic orifices, and the like are increasingly used.

However, to achieve reduced weight by replacing the material of the parts to plastics, a consideration of the assembly of the components in the mounting system is required since plastic parts have strength and tolerance issues compared to steel or aluminum parts. Thus, the robustness of the assembly is considered in the application of plastic materials. A representative example is an assembly structure of a plastic cover (e.g., a bearing cover) that uses a hook structure, which is an assembly method using a plurality of hooks. Since strength and tolerance may be complemented by the number of hooks, the hook structure is widely used.

However, the application of the hook structure for fastening the parts using hooks is insufficient in terms of fastening force and assembly robustness. In other words, the fastening force between the parts by the hooks is weak, and when the hooks move from the corresponding parts due to vibrations, the hooks may be separated from the corresponding parts. Further, the rigidity at a center bolt (e.g., the rigidity at the mount input point) is low for the conventional mount since the support height of the inner core and the center bolt coupled to the engine is high with respect to the support surface of the lower side.

Accordingly, to compensate for the low rigidity at the input point, a mass damper is disposed on the mount or mounting bracket, and thus, the weight of the mass damper adversely affect the weight reduction of the vehicle. Further, since the orifice assembly of the mount is proximate to the tire space due to the nature of the location where the mount is disposed, decreasing the height is limited. In addition, reducing the size of the insulator of rubber material is also limited, and therefore, a technique for reducing the size of the orifice assembly has been developed to decrease the height of the mount. The height of the mount may be reduced by reducing the size of the orifice assembly by applying the above-described hook structure to the mount, but since the hook structure has insufficient fastening force and assembly robustness as described above, applying the hook structure is difficult.

To facilitate understanding of the present invention, a problem of a mount and a hook structure applied to the mount and according to the related art will be described in more detail.

First, a device in the related art is configured to allow a bearing cover to be hook-coupled to an elastic support, thereby integrally coupling the bearing cover, a bellows, a barrier, the elastic support, which are components of a mount. In this reference, the mount is referred to as bearing, a diaphragm as bellows, and an orifice plate as barrier. In this configuration of the mount, since the conventional forced press-fit assembly method is changed to the hook assembly method, in which the components of the mount are coupled using a hook structure of the bearing cover, the size of the orifice assembly is reduced and the height of the mount is lowered, thereby reducing weight and cost.

The hook structure is easily separated, and is merely a structure that merely connects the components of the mount to each other and maintains the assembled state thereof before mounting the mount to a vehicle body. However, the hook structure is not suitable for coupling or supporting a pre-assembled assembly including an insulator to a mounting bracket. Accordingly, when mounting the mount to the vehicle body, the mount is supported by a separate subframe or the like, but when the subframe is unusable, the use of the mount is restricted.

Generally, when mounting and fixing the mount to the vehicle body using a metal mounting bracket (e.g., aluminum alloy), a housing of the mounting bracket is assembled to surround the mount from the outside. In particular, a lower end portion of the housing is curled (e.g., curved) to be disposed and abut the lower portion of the bearing cover, to allow the housing of the mounting bracket to support the lower portion of the bearing cover of the mount. As a result, a lower side of the bearing cover of the mount is hook-coupled downward by the lower end portion of the curled housing as described above to allow the bearing cover of the mount to be supported by the housing of the mounting bracket. Accordingly, in the structure in which the housing of the mounting bracket is curled, the housing is curled to allow the lower end portion of the housing to surround the lower side of the bearing cover from the side surface thereof. In particular, the mounting bracket is manufactured in aluminum alloy with high elongation.

However, when aluminum materials with high elongation are used, the cost is high, and strength and rigidity are low. When an aluminum material with high strength and rigidity is used, the elongation is low and cracks occur during curling of the housing, which results in a high defect rate. Accordingly, instead of curling, a pipe with the insulator of the mount locked thereto may be forcedly press-fitted into the housing of the mounting bracket of metal (e.g., aluminum), but with this forced press-fitting method, securing the parts together is difficult.

Further, the mount and the mounting bracket are fixed by a hook structure, and the hook structure for fastening the mount with the mounting bracket is illustrated in FIGS. 8 and 9. FIG. 8 is a cross-sectional view exemplarily showing a mount assembly in the related art, and FIG. 9 is an enlarged cross-sectional view of portion A in FIG. 8. As shown in FIGS. 8 and 9, a support bracket 160 is used to couple a mount 100 to a mounting bracket 170 for mounting the mount to a vehicle body.

The support bracket 160, which is a ring-shaped bracket fixedly coupled to a lower portion of the mount 100, is fitted over an orifice assembly 140 from the lower portion of the mount 100, and includes a plurality of hooks 164 along a circumferential direction. Thus, when the hooks 164 of the support bracket 160 are coupled to a housing 171 of the mounting bracket 170, the mount 100 are coupled to the mounting bracket 170 via the support bracket 160. In particular, the hook structure, for coupling and fixing the mount 100 to the mounting bracket 170 by using the hooks 164, includes the hooks 164 formed on the support bracket 160, and the hooks 164 of the support bracket 160 are coupled to stop protrusions 173 of the mounting bracket 170, thereby coupling the mount 100 to the mounting bracket and maintaining the assembled state therebetween simultaneously.

The hooks 164 of the support bracket 160 are configured to be hook-coupled downwardly to the stop protrusions 173 on a groove 172 formed on an inner surface of the housing 171 of the mounting bracket 170, and with the hooks 164 respectively hook-coupled to the stop protrusions 173, the mount 100 coupled to the support bracket 160 is supported by the mounting bracket 170. In such a configuration that uses the hook structure, since the height of the mount is decreased, the rigidity at the mount input point is increased and the weight is reduced due to the application of the plastics, and since the hooks, which are elastic structures for hook-coupling, are disposed inside the mounting bracket, the layout is improved as well.

However, the hook structure has insufficient fastening force and assembly robustness. In other words, the fastening force between the parts by the hooks is weak and the part may be separated easily from the other part when the hooks are moved with respect to the counterpart due to vibration or the like. FIG. 9 is a view for illustrating a hook structure of a mount in the related art. As shown in FIG. 9, when the hooks 164 formed in the support bracket 160 of a plastic material (e.g., a synthetic resin) are bent by the force due to vibration or the like, the components of the mount 100 such as an insulator 130 are separated from the mounting bracket 170 to the lower side. In other words, when the hooks 164 are moved or bent in the releasing direction rather than in the coupling direction with respect to the stop protrusions 173 of the mounting bracket 170, the components of the mount 100 including the insulator 130 may be separated from the mounting bracket 170.

The foregoing is intended merely to aid in the understanding of the background of the present invention, and is not intended to mean that the present invention falls within the purview of the related art that is already known to those skilled in the art.

SUMMARY

Accordingly, the present invention provides a mount assembly for a vehicle, in particular, the mount assembly capable of preventing release of coupling between parts due to separation of a hook from a stop protrusion in a configuration in which a hook structure is used.

To achieve the above object, the mount assembly may include a mount to support an in-vehicle device and a support bracket coupled to the mount and locked thereto. with the support bracket may include a first hook The mount assembly may further include a mounting bracket configured to couple the mount to a vehicle body side and support the mount. The mounting bracket may include a housing to which the mount is coupled and a first stop protrusion to which the first hook of the support bracket is hook-coupled to allow the support bracket to be coupled and locked to the mounting bracket by coupling between the first hook and the first stop protrusion In particular, the mount assembly may further include a wedge ring to support the first hook coupled to the first stop protrusion from behind when assembled to a lower outer circumferential surface of the mount to prevent the first hook from bending backward and being separated from the first stop protrusion of the mounting bracket. The wedge ring may be formed in a ring shape and include a protruding portion that protrudes radially outward to support the first hook from behind to prevent the first hook from being separated from the first stop protrusion.

According to the mount assembly for a vehicle of the present invention, a wedge ring for supporting and locking a hook with a mounting bracket coupled therewith is provided to prevent the hook of the support bracket from being moved or bent due to the wedge ring. Therefore, the hook may be prevented from being released and the hook-coupled state may be maintained, and thus, the separation of the mount including the insulator may be effectively prevented.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, exemplary embodiments of the present invention will be described with reference to the accompanying drawings. The present invention, however, is not limited to the example embodiments set forth herein, and those skilled in the art will appreciate that the present invention may be embodied in many alternate forms.

In the present invention, the mount assembly may include a support bracket of a plastic material, and to prevent hooks of the support bracket from being moved or bent by the force due to vibration or the like, an anti-release structure may support and lock the hooks engaged with the mounting brackets and to firmly retain the hooks in the engaged state.

The mount assembly according to an exemplary embodiment of the present invention, and particularly the mount assembly including the anti-release structure, will be described in detail with reference to the drawings.

Figure 1A:
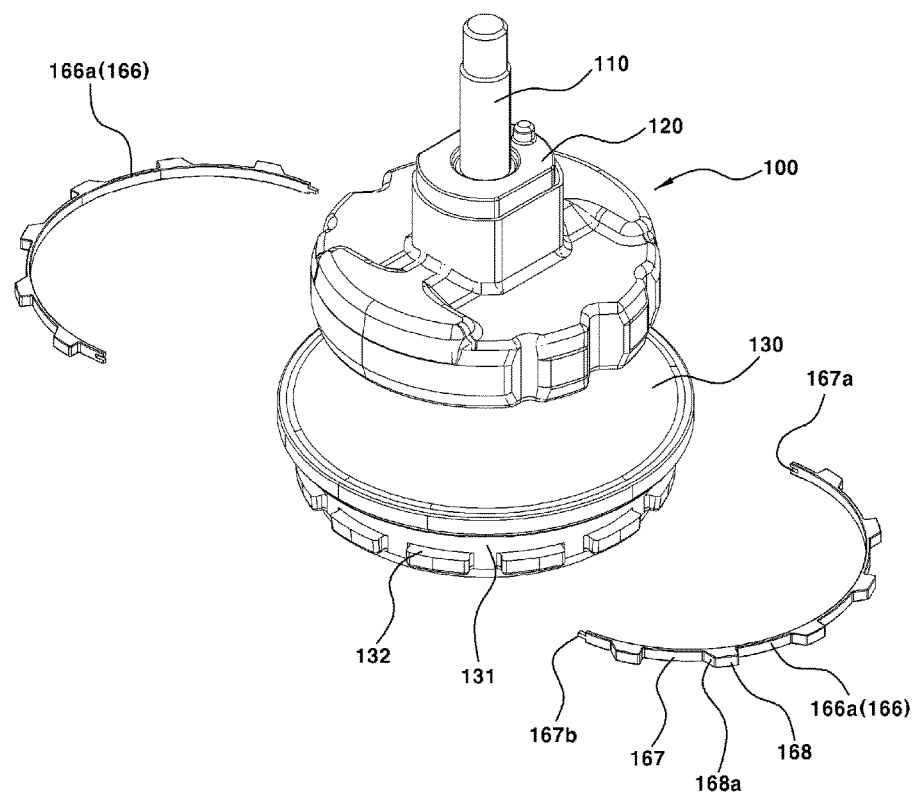
FIGS. 1A to 1E are views sequentially showing an assembly process of a mount assembly according to an exemplary embodiment of the present invention.
Figure 1B:
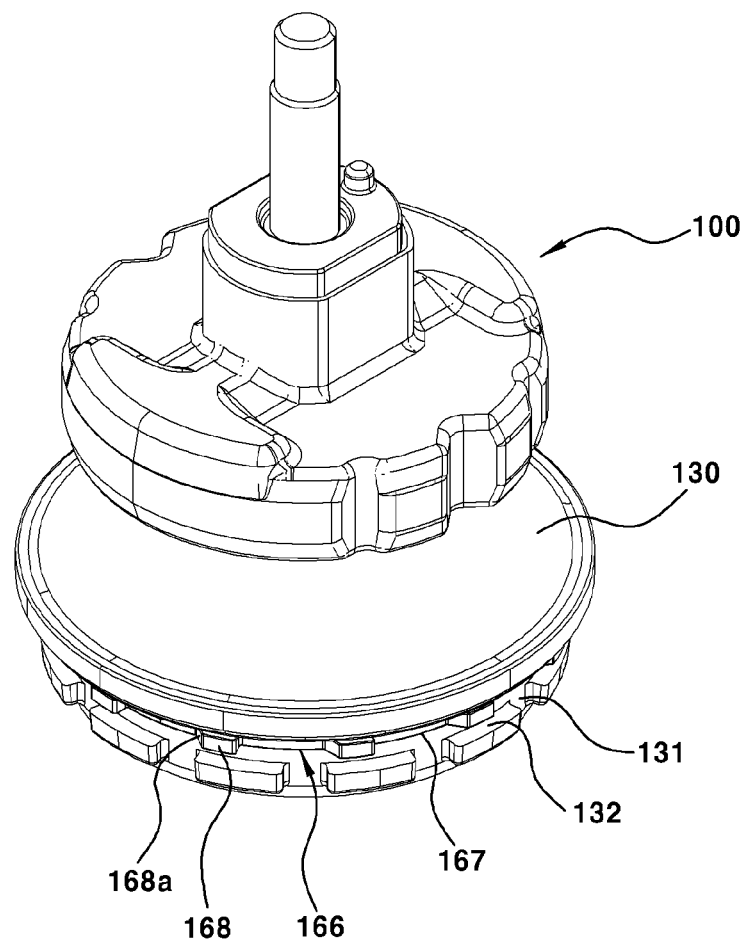
Figure 1C:
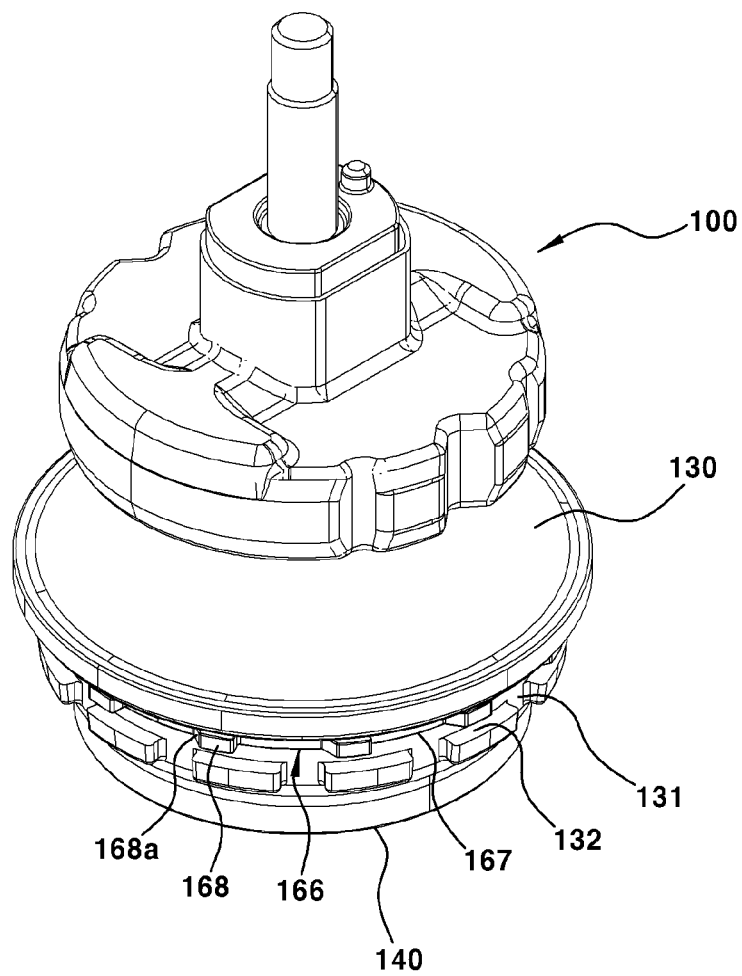
Figure 1D:
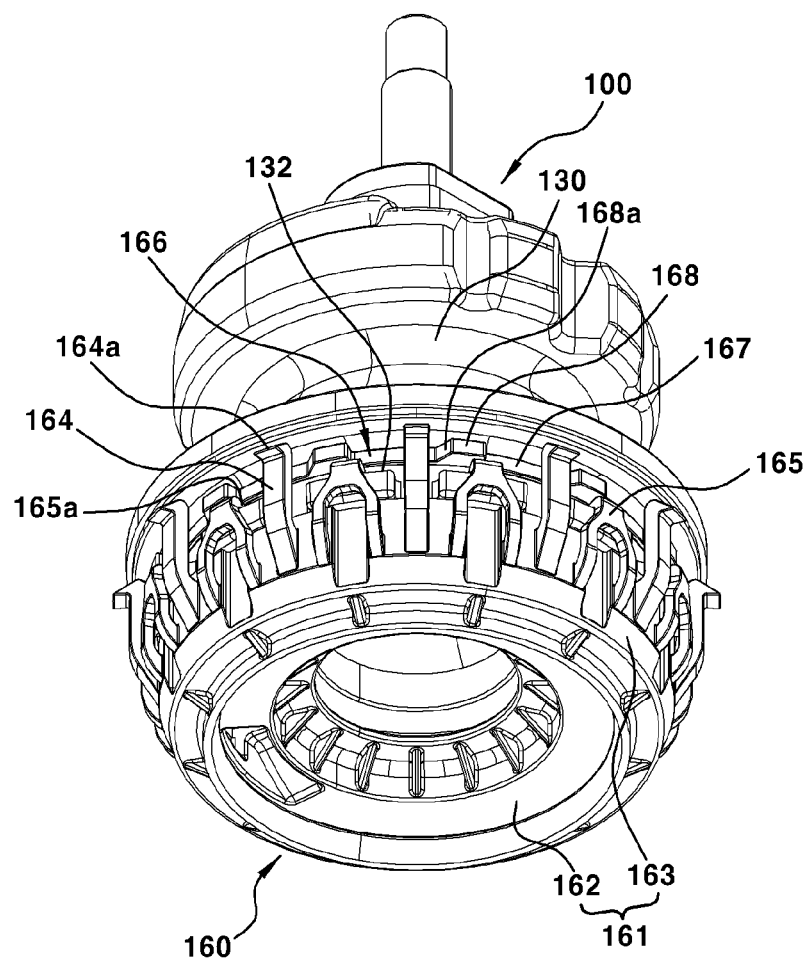
Figure 1E:
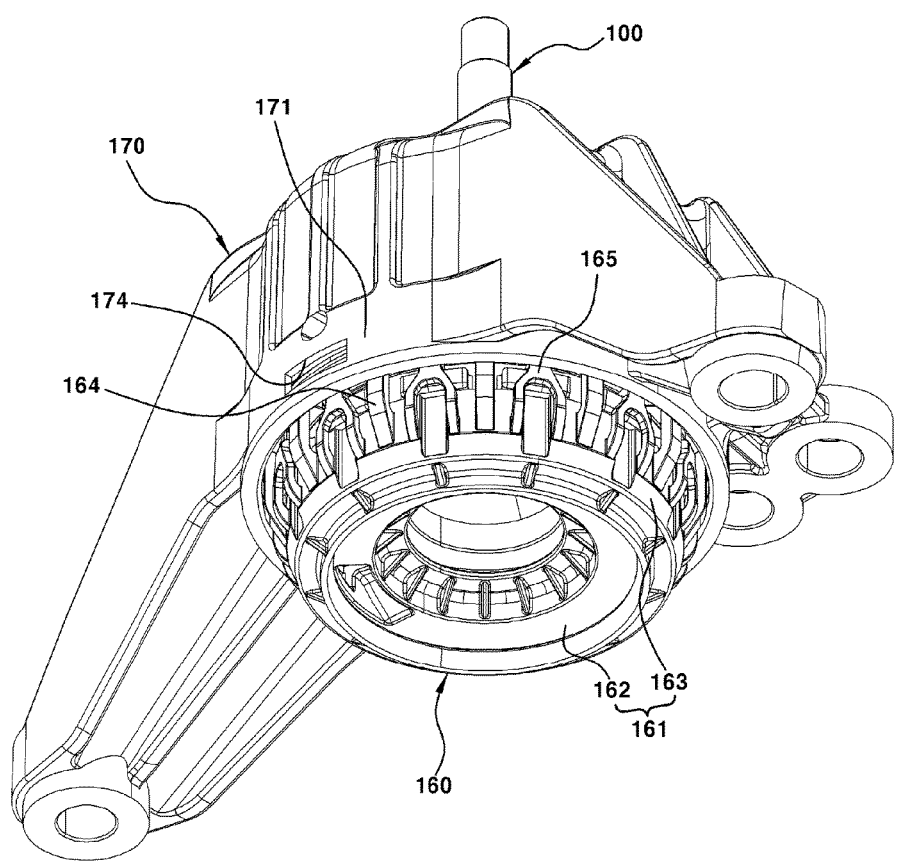
Figure 2:
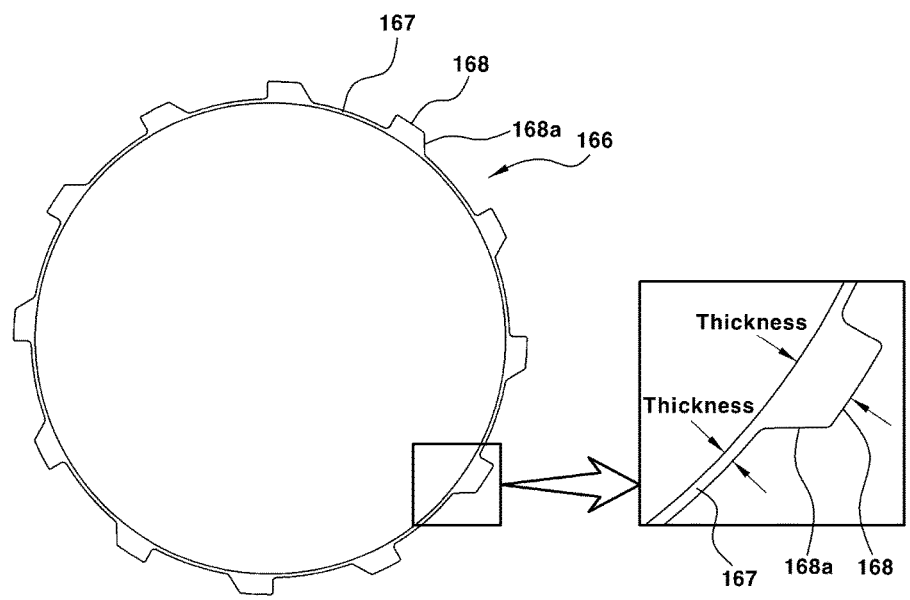
FIG. 2 is a plan view showing a wedge ring in the mount assembly according to an exemplary embodiment of the present invention.
Figure 3:
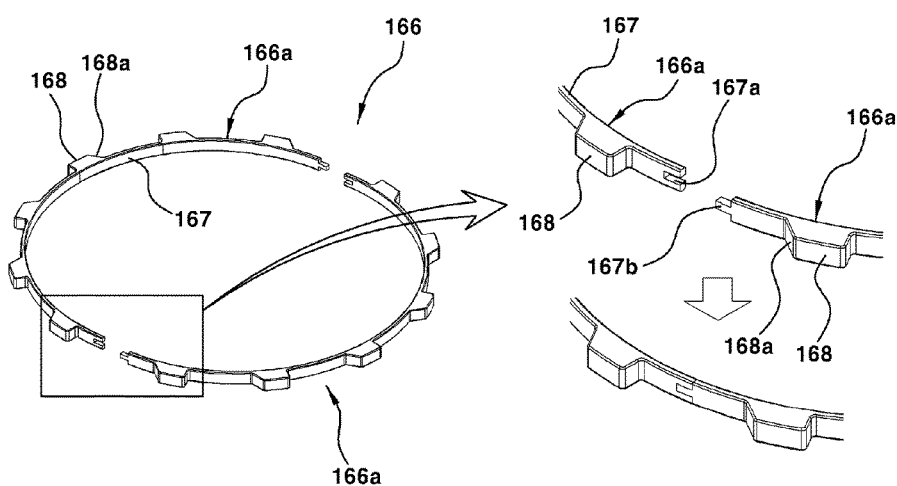
FIG. 3 is a perspective view showing the wedge ring in the mount assembly according to an exemplary embodiment of the present invention.

FIGS. 1A to 1E are views sequentially showing an assembly process of a mount assembly according to an exemplary embodiment of the present invention, FIG. 2 is a plan view showing a wedge ring in the mount assembly according to an exemplary embodiment of the present invention and FIG. 3 is a perspective view showing the wedge ring in the mount assembly according to an exemplary embodiment of the present invention. FIGS. 4A to 4D are cross-sectional views sequentially showing assembly steps of the mount assembly according to an exemplary embodiment of the present invention.

A mount assembly for a vehicle according to an exemplary embodiment of the present invention for supporting an in-vehicle device may include an engine mount assembly for supporting an engine. The engine mount assembly may include a mount 100 configured to support an in-vehicle device; a support bracket 160 coupled to the mount 100 and locked thereto; and a mounting bracket 170 to mount the mount 100 to a vehicle body side and support the mount 100 while being coupled to the mount 100 and the support bracket 170. Further, in the assembly for a vehicle according to an exemplary embodiment of the present invention, the mount 100 may include a center bolt 110 fastened to an engine side; an inner core 120 with the center bolt engaged therewith; and the insulator 130 of a rubber material formed to be integrally coupled with the inner core 120.

The insulator 130 may fix and support the inner core 120 and may form an upper liquid chamber C1 along with the orifice assembly 140 under the insulator. The inner core 120 may be made of a metallic material, for example, aluminum alloy, or may be formed of a plastic material (e.g., a synthetic resin). A pipe 131 may be coupled to a lower portion of the insulator 130, wherein the pipe 131 may be formed of a plastic material. Further, after the inner core 120 in which the center bolt 110 is disposed is manufactured, the inner core 120 and the pipe 131 may be mounted in the mold, and then the rubber insulator 130 may be formed to be coupled integrally to the inner core 120 and the pipe 131 through a curing process.

The orifice assembly 140 may include an orifice plate 141 and a membrane 145. The orifice plate 141 may be laterally disposed within the mount 100 at a location below the insulator 130 to partition a liquid chamber in the mount into the upper liquid chamber C1 and a lower liquid chamber C2. The orifice plate 141 may include an upper plate 142 and a lower plate 143. Further, the orifice plate 141 may include an orifice 144 that forms an annular bypass flow path (also referred to as an inertia track) for guiding fluid flow between the upper liquid chamber C1 and the lower liquid chamber C2. The orifice plate 141 may include a first aperture that allows communication between the orifice 144 and the upper liquid chamber C1 and a second aperture that allows communication between the orifice 144 and the lower liquid chamber C2.

Accordingly, the upper liquid chamber C1, the orifice 144, and the lower liquid chamber C2 may communicate with each other through the apertures of the orifice plate 141 to allow the fluid to flow therebetween. Thus, the orifice 144 may provide a flow path for the fluid and may communicate with the upper liquid chamber C1 and the lower liquid chamber C2 through the apertures, thereby providing a fluid passage that connects the upper liquid chamber C1 and the lower liquid chamber C2, i.e., a flow path that allows the fluid to move between the liquid chambers C1 and C2 on both sides. Further, a diaphragm 150 may be disposed below the orifice plate 141 and both the orifice plate 141 and the diaphragm 150 may the lower liquid chamber C2.

As described above, after the rubber insulator 130 integrally coupled to the inner core 120 and the pipe 131 is formed through curing process, a wedge ring 166 may be assembled on a lower outer circumferential surface of the mount 100, i.e., on outer circumferential surface of the pipe 131. Subsequently, the orifice assembly 140 having the upper plate 142 and the lower plate 143 of the orifice plate 141 and the membrane 145 disposed between the upper plate 142 and the lower plate 143 may be assembled to a lower end portion of the insulator 130. After the diaphragm 150 is assembled to a lower portion of the orifice assembly 140, the support bracket 160 having a hook structure may be assembled at a lower side of the diaphragm 150 as described below.

In the mount 100 as described above, the inner space of the mount 100 including the upper liquid chamber C1 and the lower liquid chamber C2 may be filled with fluid and sealed, and the mount 100 may be coupled to the mounting bracket 170 to mount to the vehicle body. In particular, the lower portion of the mount 100 may be fastened to the mounting bracket 170 using the support bracket 160, wherein a hook-coupling method may be used in which the hooks 164 of the support bracket 160 are locked to the mounting bracket 170. Herein, the lower portion of the mount 100 may refer to the lower part of the mount 100 where the pipe 131, the orifice assembly 140, and the diaphragm 150 are disposed.

In the exemplary embodiment of the present invention, the support bracket 160 may be fastened to the mounting bracket 170 by the hook structure while being coupled to the lower portion of the mount 100, thereby integrally coupling and fixing the lower portion of the mount 100 to the mounting bracket 170. Further, the support bracket 160 may include a hook structure fastened to the lower portion of the mount 100. Accordingly, in the exemplary embodiment of the present invention, the support bracket 160 may include a hook structure that is fastened to the mounting bracket 170 and the lower portion of the mount 100, respectively.

Furthermore, the support bracket 160 may include an annular ring 161 coupled along the entire lower portion of the mount 100 to abut the lower portion of the mount 100 and support the mount 100 by surrounding the mount 100. The support bracket 160 may also include a hook structure formed on the ring 161 and fastened to the mounting bracket 170. In addition, the support bracket 160 may include a hook structure fastened to the lower portion of the mount 100.

In particular, the ring 161 of the support bracket 160 may include a ring-shaped bottom portion 162 configured to be coupled to a lower surface of the mount 100, i.e., the edge portion of the diaphragm 150 to abut the ring-shaped bottom portion 162 while being coupled to the lower portion of the mount 100 and a ring-shaped side portion 163 that extends integrally from the bottom portion 162 upwardly and is disposed to surround the lower side surface of the mount 100, i.e., a side surface of the orifice assembly 140. The bottom portion 162 and the side portion 163 may be formed integrally to form the ring 161 and the bottom portion 162 may support the edge of the diaphragm 150, which is the lower surface of the mount 100.

Further, the side portion 163 of the ring 161 may integrally include a hook structure for fastening the mounting bracket 170 and the lower portion of the mount 100 together. The hook structure may include a first hook 164 for fastening with the mounting bracket 170 and a second hook 165 for fastening with the lower portion of the mount 100. The first hook 164 and the second hook 165 may be formed to extend upwardly from an outer circumferential surface of the ring 161 (i.e., an outer circumferential surface of the side portion). An end portion of the first hook 164 may be formed with a stop end 164a to be hook-coupled downwardly to the first stop protrusions 173 on the groove 172 formed on the inner surface of the housing 171 of the mounting bracket 170.

An end portion of the second hook 165 may be formed with a stop end (165a in FIG. 1D) to be hook-coupled downwardly to the lower portion of the mount 100, and more particularly, to a second stop protrusion 132 that protrudes from the outer circumferential surface of the pipe 131 coupled to the insulator 130. In particular, each hook may be formed to allow the upper end of the first hook 164 to be disposed higher than the upper end of the second hook 165. The first hook 164 may be disposed inside the housing 171 of the mounting bracket 170 to be fastened to the first stop protrusions 173 of the housing 171 disposed outside of the first hook 164, and the second hook 165 may be fastened to the second stop protrusion 132 of the lower portion of the mount 100 disposed inside of the second hook. Accordingly, the stop end 164a may protrude outwardly from the upper end portion of the first hook 164 and the stop end 165a may protrude inwardly from the upper end portion of the second hook 165.

Figure 5:
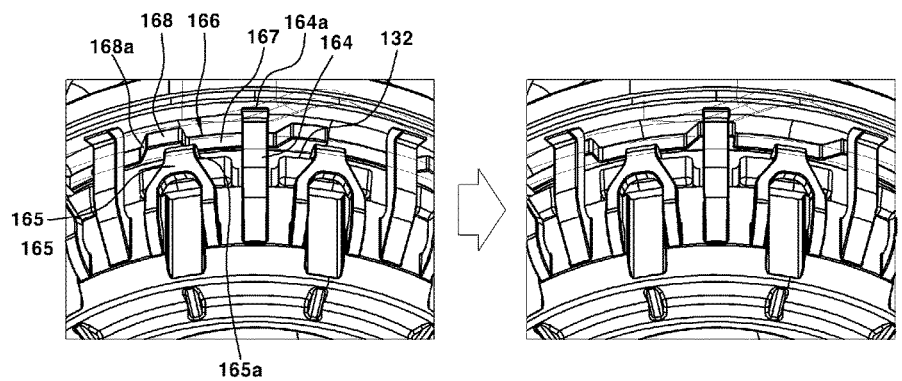
FIG. 5 is a perspective view showing states before and after the wedge ring is rotated in the mount assembly according to an exemplary embodiment of the present invention.

In an exemplary embodiment, a plurality of first hooks 164 and second hooks 165 may be in plurality to be arranged at predetermined intervals along a circumferential direction in the ring 161. As shown in FIG. 5, each first hook 164 and each second hook 165 may be alternately arranged one after the other in the circumferential direction of the ring 161 of the support bracket 160. Furthermore, in the exemplary embodiment of the present invention, the support bracket 160 may be made and formed of a plastic material (e.g., a synthetic resin), and thus, the first hook 164 and the second hook 165 may have resilient (e.g., elastic) structures.

The first hook 164 may be engaged with the first stop protrusions 173 formed on the inner circumferential surface of the housing 171 of the mounting bracket 170. Further, after the insulator 130, the orifice assembly 140, the diaphragm 150, and the like are assembled, the assembled mount 100 may be press-fitted into the housing 171 of the mounting bracket 170, whereby the hook structure is fastened. When press-fitting, the first hook 164 and the second hook 165 may be bent (e.g., elastically deformed) in a direction opposite to the fastening direction due to the contact surfaces. When the hook is press-fitted to the predetermined position, the hooks may be restored by the elasticity, and the stop ends 164a and 165a of the hooks may be engaged with respective stop protrusions 132 and 173.

In other words, before the first hook 164 is engaged with the first stop protrusions 173 of the mounting bracket 170, while the stop end 164a of the first hook 164 is in contact with the inner circumferential surface of the mounting bracket 170, when the first hook 164 is deformed inwardly and the stop end 164a of the first hook 164 reaches the groove 172 of the mounting bracket 170, the first hook 164 may be restored outwardly to the shape thereof by elasticity and the stop end 164a of the first hook 164 may be stopped by the first stop protrusions 173 of the groove 172. Likewise, before the second hook 165 is fastened to the second stop protrusion 132 of the pipe 131, which is the lower portion of the mount 100, while the stop end 165a of the second hook 165 is in contact with the outer circumferential surface of the pipe 131, the second hook 165 may be deformed outwardly and the stop end 165a of the second hook 165 may slide over the second stop protrusion 132. Accordingly, the second hook 165 may be restored inwardly to the shape thereof by elasticity, and the stop end 165a of the second hook 165 may be stopped by the second stop protrusion 132.

To prevent the first hook 164 from being separated from the first stop protrusions 173 of the mounting bracket 170, the mount assembly according to an exemplary embodiment of the present invention may include the wedge ring 166 that retains the first hook 164 to be engaged with the first stop protrusions 173 from the inside of the first hook to prevent the first hook 164 from bending (e.g., being deflected) inwardly. When the first hook 164 is bent inwardly, the stop end 164a may be separated from the first stop protrusions 173 of the mounting bracket 170 disposed outside the stop end, and the fastening state of the first hook 164 with the mounting bracket 170 may be released. Accordingly, in the present invention, the wedge ring 166 may be assembled, which retains the first hook 164 from the inside of the first hook 164 to prevent the first hook 164 from being separated from the first stop protrusions 173.

The wedge ring 166 may be made and formed of a plastic material (e.g., a synthetic resin), and as shown in FIG. 2, the wedge ring 166 may be made to have elasticity and to have a substantially circular ring shape. The wedge ring 166 may include protruding portions 168 that protrude radially outward that are arranged at predetermined intervals along the circumferential direction. The protruding portions 168 may be formed at predetermined intervals along the circumferential direction of the wedge ring 166, and the number and the circumferential interval thereof may correspond to the number and the interval of the first hooks 164 formed on the support bracket 160. Accordingly, the wedge ring 166 may include a thin base ring 167 and the protruding portions 168 thicker than the base ring 167, and the protruding portions 168 may be formed on the base ring 167 at predetermined intervals.

In an exemplary embodiment, the protruding portion 168 may be formed to have an inclined surface 168a on a side surface thereof. Therefore, when the wedge ring 166 is rotated to allow the protruding portion 168 to support the first hook 164 from the rear, the first hook 164 may slide on the inclined surface 168a of the protruding portion 168, and thus, the protruding portion 168 may be forcedly fitted into a space between the lower outer circumferential surface of the mount 100 (i.e., the outer circumferential surface of the pipe 131) and the first hook 164 more easily.

As shown in FIG. 3, the wedge ring 166 may be fabricated in two parts by a length of a half circle. In other words, one wedge ring 166 may include two semicircular members 166a, and the two semicircular members 166a may be formed to have substantially the same shape. In particular, the semicircular member 166a may include an insertion groove 167a disposed at a first end thereof and an insertion protrusion 167b disposed at a second end thereof. Accordingly, the insertion groove 167a of one semicircular member 166a may be assembled to the insertion protrusion 167b of the other semicircular member by force-fitting, and with this force-fitting by groove-protrusion, the two semicircular members 166a may be assembled into a shape of the circular wedge ring 166, as shown in FIG. 2, to be disposed on the lower outer circumferential surface of the mount 100, i.e., on the outer circumferential surface of the pipe 131 with the insulator 130 coupled thereto.

As shown in FIG. 3, the semicircular members 166a, which are left and right halves of the wedge ring of sub-stantially the same shape, may be fabricated, and may subsequently be assembled to the circular one wedge ring 166. Since one wedge ring 166 may be constructed by assembling two semicircular members 166a of the same shape that is made from one mold, cost of building molds and assembly errors may be reduced.

Figure 6:
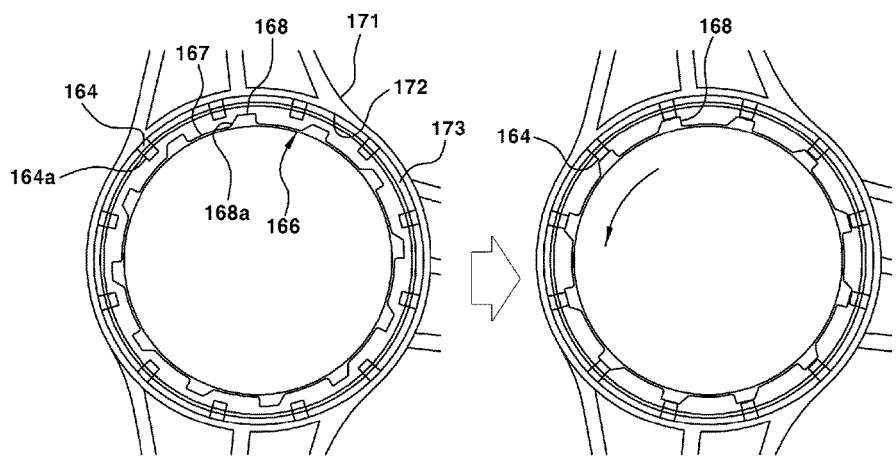
FIG. 6 is a cross-sectional view showing states before and after the wedge ring is rotated in the mount assembly according to an exemplary embodiment of the present invention.
Figure 7:
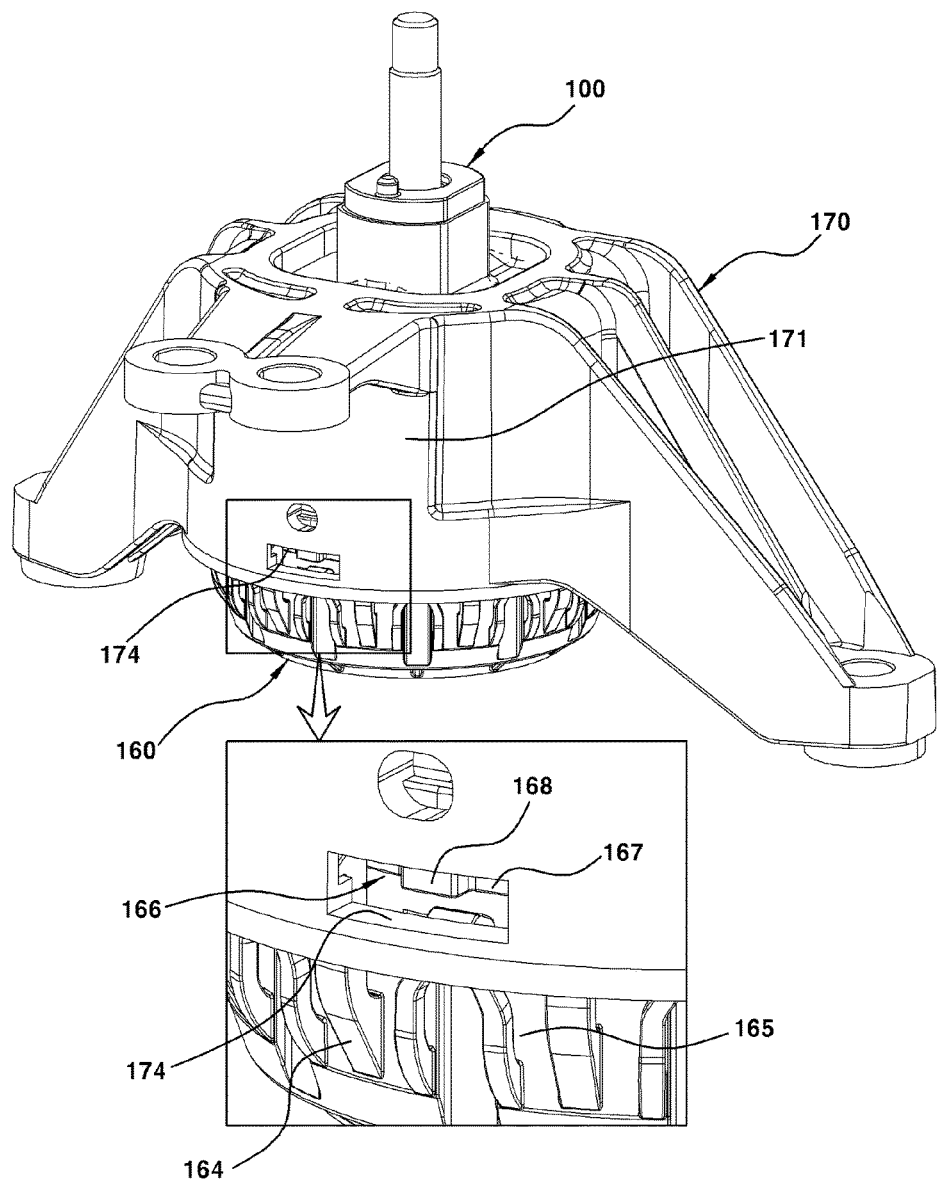
FIG. 7 is a perspective view showing a ring manipulation aperture of a mounting bracket according to an exemplary embodiment of the present invention.
Figure 8:
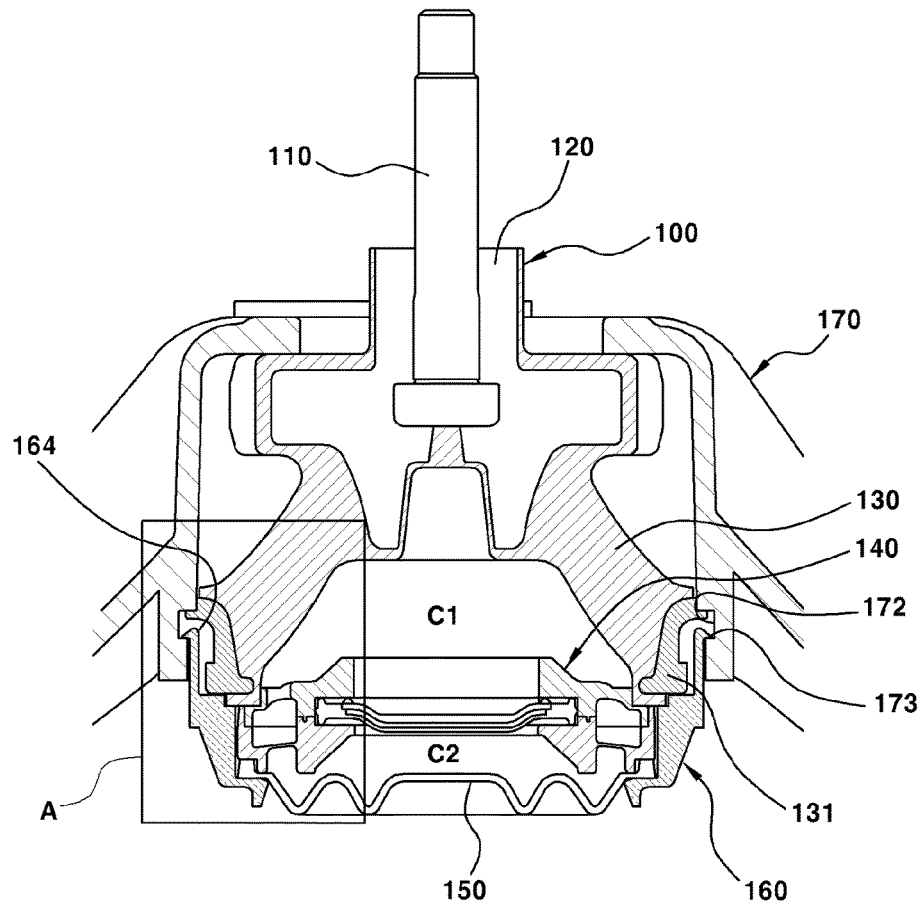
FIG. 8 is a cross-sectional view showing a mount assembly in the related art.
Figure 9:
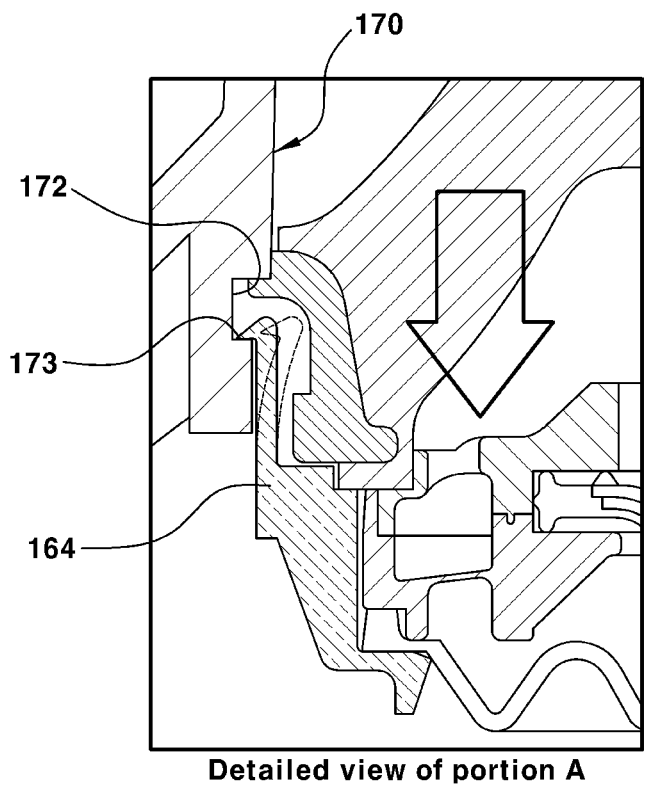
FIG. 9 is an enlarged cross-sectional view of portion A in FIG. 8 of the related art.

FIG. 5 is a perspective view showing states before and after the wedge ring is rotated in the mount assembly according to an exemplary embodiment of the present invention, FIG. 6 is a cross-sectional view showing states before and after the wedge ring is rotated in the mount assembly according to an exemplary embodiment of the present invention, and FIG. 7 is a perspective view showing a ring manipulation aperture of a mounting bracket according to an exemplary embodiment of the present invention. Further, when assembled, while the center bolt 110, the inner core 120, the insulator 130, and the pipe 131 are assembled (see FIG. 1A), the wedge ring 166 may be assembled to be disposed on the lower outer circumferential surface of the mount 100 (see FIG. 1B). After the orifice assembly 140 and the diaphragm 150 are assembled (see FIG. 1C), the support bracket 160 may be coupled to the lower portion of the mount 100 from the lower side to the upper side (see FIG. 1D).

During this process, the second hook 165 of the support bracket 160 may be hook-coupled to the lower portion of the mount 100 and, more particularly, to the stop protrusion 132 that protrudes from the outer circumferential surface of the pipe 131 disposed at the lower portion of the mount 100, whereby the support bracket 160 may be fastened to the lower portion of the mount 100. In particular, the wedge ring 166 may be disposed at the back (inner side) of the first hook 164 formed with the stop end 164a while being disposed at a location higher than the stop end 165a of the second hook 165 and the second stop protrusion 132. Further, although the wedge ring 166 may be disposed on the outer circumferential surface of the pipe 131 at the back (inner side) of the first hook 164 of the support bracket 160, each protruding portion 168 arranged along the circumferential direction of the wedge ring 166 may be disposed between two adjacent first hooks 164 in the circumferential direction of the support bracket 160.

Subsequently, the mounting bracket 170 may be assembled (see FIG. 1E). After the mount 100 is inserted in the housing 171 of the mounting bracket 170, the support bracket 160 coupled to the mount 100 may be hook-coupled to the mounting bracket 170 with the first hook 164. In other words, the first hook 164 of the support bracket 160 may be hook-coupled to the first stop protrusions 173 on the groove 172 formed on the inner surface of the housing 171 of the mounting bracket 170, and the stop end 164a of the first hook 164 may be hook-coupled downwardly to the first stop protrusions 173 while being inserted in the groove 172. In particular, each protruding portion 168 may be disposed between two adjacent first hooks 164.

Furthermore, the wedge ring 166 may be rotated in a predetermined direction through a ring manipulation aperture 174 of the mounting bracket 170, which will be described below. As a result, the wedge ring 166 may be rotated and the protruding portions 168 may be fitted into a space between end portions of the first hooks 164 formed with stop ends 164a, i.e., upper end portions of the first hooks 164 and the outer circumferential surface of the pipe 131. Accordingly, the protruding portions 168 of the wedge ring 166 may retain (e.g., hold) the upper end portions of the first hooks 164 by supporting the upper end portions of the first hooks 164 from the rear (from the inside), thereby preventing the first hooks 164 from being bent backward.

In other words, since the wedge ring 166 supports the upper end portions of the first hooks 164 through each protruding portion 168 from the rear (from the inside), after being assembled, each first hook 164 may be prevented from bending backward by the wedge ring 166. Therefore, since the stop end 164a of the first hook 164 may be prevented from being separated from the first stop protrusion 173, the fastening state of the first hook 164 may be prevented from being released.

Figure 4A:
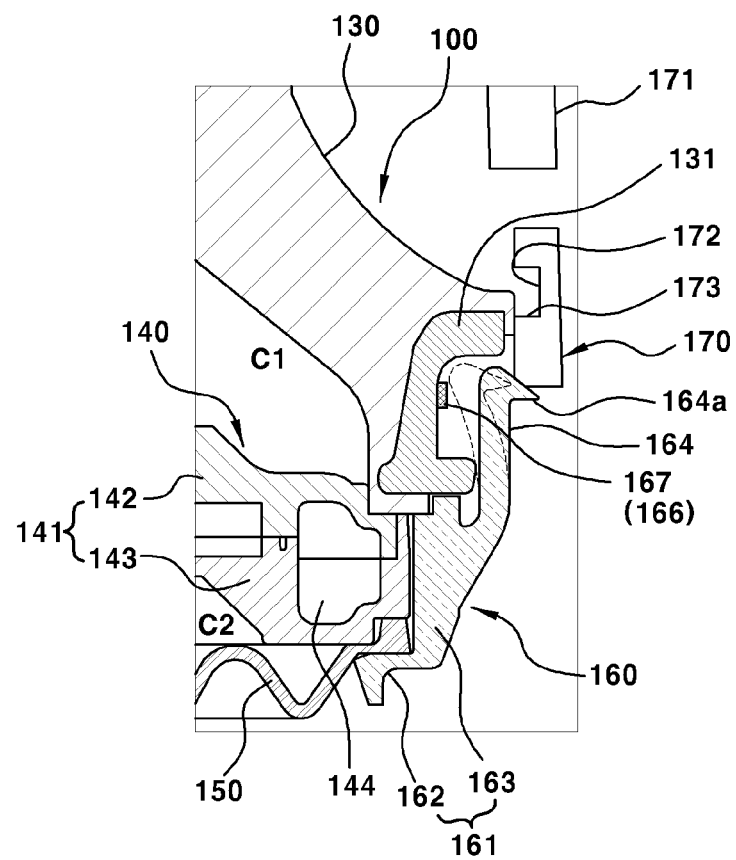
FIGS. 4A to 4D are cross-sectional views sequentially showing assembly steps of the mount assembly according to an exemplary embodiment of the present invention.
Figure 4B:
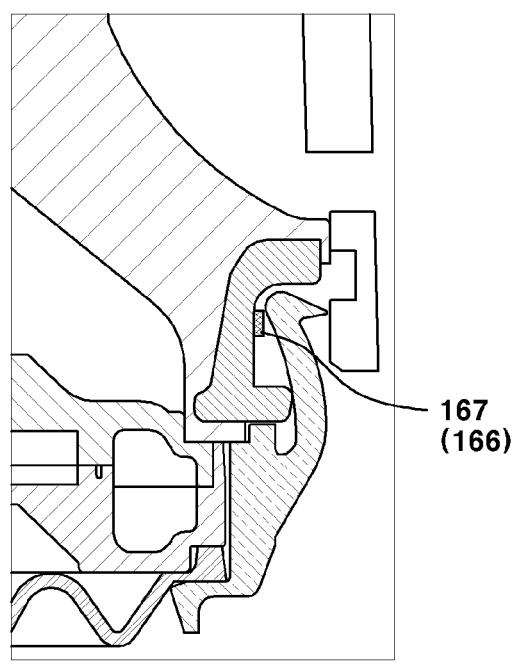
Figure 4C:
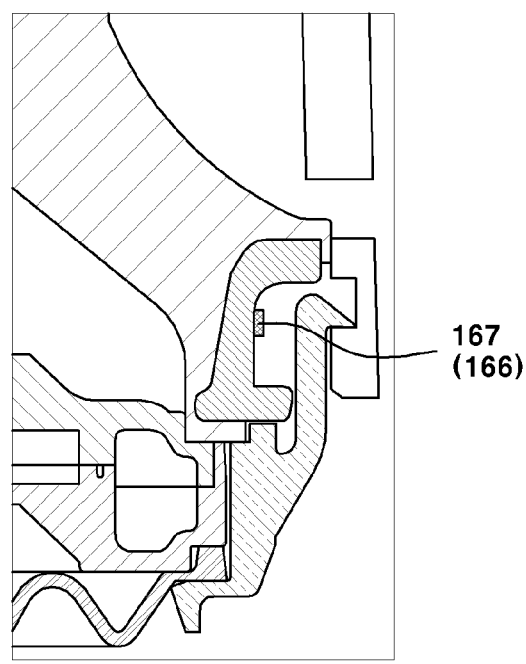

Referring to FIGS. 4A to 4C, the support bracket 160 may be coupled to the mounting bracket 170 to allow the stop end 164a of the first hook 164 to be hook-coupled to the first stop protrusions 173 of the mounting bracket 170, and in this process, each protruding portion 168 of the wedge ring 166 may be disposed between two adjacent first hooks 164 of the support bracket 160 (e.g., a state of the wedge ring pre-rotation). In other words, as shown in FIGS. 4A to 4C, since the base ring 167 is disposed, instead of the protruding portion 168, at the back of each first hook 164 of the support bracket 160, a space may be provided in which the first hook 164 may be bent backward during the process of being hook-coupled to the first stop protrusion 173 of the mounting bracket 170. Accordingly, the first hook 164 may be hook-coupled to the first stop protrusion 173 and fastened thereto while being bent backward toward the base ring 167 of the wedge ring 166.

Figure 4D:
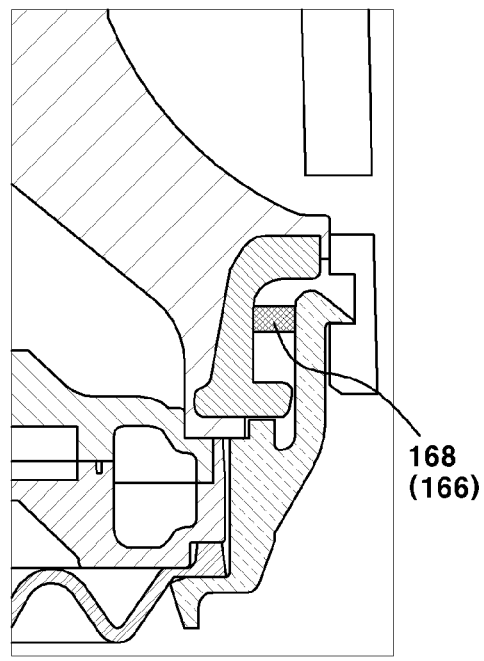

Subsequently, when an operator rotates the wedge ring 166 at the back of the first hooks 164 in the predetermined direction, to lock the first hook 164, i.e, to prevent the stop end 164a from being separated from the first stop protrusion 173, as shown in FIG. 4D, the protruding portion 168 of the wedge ring 166 may be disposed at the back of the upper portion of the first hook 164, and may support and retain the first hooks 164, whereby the first hook 164 may be prevented from being bent and separated.

FIGS. 5 and 6 show states before and after the wedge ring 166 is rotated in the mount assembly. In the state before the wedge ring 166 is rotated, as shown in the left panels, the protruding portion 168 may be disposed in the space between two adjacent first hooks 164. Since the base ring 167 is disposed at the back (inner side) of the first hook 164, a space may be provided in which the first hook 164 may be bent, and accordingly, when coupled to the mounting bracket 170, the first hook 164 of the support bracket 160 may bend backward to be hook-coupled to the first stop protrusions 173 of the groove 172.

On the other hand, as shown in the right panels of FIGS. 5 and 6, after the wedge ring 166 is rotated counterclockwise, the protruding portion 168 of the wedge ring 166 may be disposed at the back (inner side) of the first hook 164, thereby locking the first hook 164 and preventing the first hook 164 from bending. Thus, the fastening state of the first hook 164 may be maintained, and the first hook 164 may be prevented from being moved or bent when the protruding portion 168 of the wedge ring 166 supports the first hook 164 on the backside. Accordingly, undesirable disengagement of the first hook may be prevented.

FIG. 7 shows the ring manipulation aperture 174 formed through the housing 171 of the mounting bracket 170. An operator may rotate the wedge ring 166 assembled on the outer circumferential surface of the pipe 131 to a desired direction by inserting a tool through the ring manipulation aperture 174 formed on a side of the mounting bracket 170 to push the protruding portion 168.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A mount assembly for a vehicle, comprising:
   a mount to support an in-vehicle device;
   a support bracket coupled to the mount and locked thereto, wherein the support bracket includes a first hook;
   a mounting bracket configured to couple the mount to a vehicle body side and support the mount, wherein the mounting bracket includes a housing to which the mount is coupled and a first stop protrusion to which the first hook of the support bracket is hook-coupled to couple and lock the support bracket to the mounting bracket by coupling between the first hook and the first stop protrusion; and
   a wedge ring to support the first hook coupled to the first stop protrusion from behind when assembled to a lower outer circumferential surface of the mount to prevent the first hook from bending backward and being separated from the first stop protrusion of the mounting bracket,
   wherein the wedge ring is formed in a ring shape and includes a protruding portion that protrudes radially outward, and
   wherein the protruding portion supports the first hook from behind to prevent the first hook from being separated from the first stop protrusion.

2. The mount assembly of claim 1, wherein the support bracket is coupled and locked to the mount to surround a lower portion of the mount, a plurality of first hooks are arranged at predetermined intervals along a circumferential direction in the support bracket, a plurality of first stop protrusions are disposed in the mounting bracket with the plurality of first hooks coupled thereto, and the wedge ring is assembled to be disposed between the lower outer circumferential surface of the mount and the plurality of first hooks.

3. The mount assembly of claim 2, wherein a plurality of protruding portions are arranged at predetermined intervals along a circumferential direction, and each of the protruding portions supports one of the plurality of the first hooks.

4. The mount assembly of claim 2, wherein a plurality of protruding portions are arranged at predetermined intervals along a circumferential direction, the number of the protruding portions and the number of the first hooks are equal, and each of the protruding portions and each of the first hooks are arranged at predetermined intervals along the circumferential direction.

5. The mount assembly of claim 1, wherein the wedge ring includes:
   a first semicircular member; and
   a second semicircular member,
   wherein the first and the second semicircular members are formed to have a substantially same shape, and
   wherein each of the first and the second semicircular members includes an insertion groove disposed at a first end thereof and an insertion protrusion disposed at a second end thereof to allow the insertion protrusion of the first semicircular member is inserted in the insertion groove of the second semicircular member to assemble the first and the second semicircular members to the wedge ring of a circular shape.

6. The mount assembly of claim 1, wherein the protruding portion includes an inclined surface on a side surface thereof.

7. The mount assembly of claim 1, wherein when a stop end of the first hook is hook-coupled to the first stop protrusion, the wedge ring is disposed to support an end portion of the first hook with the stop end disposed thereon from behind.

8. The mount assembly of claim 7, wherein the protruding portion includes an inclined surface on a side surface thereof.

9. The mount assembly of claim 1, wherein a lower portion of the mount is a pipe coupled to a lower portion of an insulator.

10. The mount assembly of claim 1, wherein the housing of the mounting bracket accommodates the mount therein, and a ring manipulation aperture is formed through the housing of the mounting bracket to allow rotation of the wedge ring to dispose the protruding portion behind the first hook.

11. The mount assembly of claim 1, wherein the housing of the mounting bracket accommodates the mount therein, the housing of the mounting bracket is disposed on an inner circumferential surface thereof with the first stop protrusion, and the first hook of the support bracket is hook-coupled downwardly to the first stop protrusion on the inner circumferential surface of the housing.

12. The mount assembly of claim 1, wherein the support bracket includes a second hook, and the mount is disposed on the lower outer circumferential surface thereof with a second stop protrusion to which the second hook is hook-coupled to couple and lock the support bracket to the mount by coupling between the second hook and the second stop protrusion.

13. The mount assembly of claim 12, wherein a plurality of second hooks are arranged at predetermined intervals along a circumferential direction in the support bracket, and a plurality of second stop protrusions are disposed on the lower outer circumferential surface of the mount with the plurality of second hooks coupled thereto.

14. The mount assembly of claim 12, wherein a lower portion of the mount is a pipe coupled to a lower portion of an insulator.

\* \* \* \* \*